United States Patent
Kurshan et al.

(10) Patent No.: US 12,417,239 B2
(45) Date of Patent: Sep. 16, 2025

(54) SYSTEM, APPARATUS, AND METHOD FOR STRUCTURING DOCUMENTARY DATA FOR IMPROVED TOPIC EXTRACTION AND MODELING

(71) Applicant: Morgan Stanley Services Group Inc., New York, NY (US)

(72) Inventors: Eren Kurshan, New York, NY (US); Nicolas Seyot, Stamford, CT (US)

(73) Assignee: Morgan Stanley Services Group Inc., New York, NY (US)

( * ) Notice: Subject to any disclaimer, the term of this patent is extended or adjusted under 35 U.S.C. 154(b) by 329 days.

(21) Appl. No.: 18/052,772

(22) Filed: Nov. 4, 2022

(65) Prior Publication Data
US 2024/0152538 A1   May 9, 2024

(51) Int. Cl.
  *G06F 16/35*  (2025.01)
  *G06F 40/279*  (2020.01)
  *G06F 40/30*  (2020.01)
  *G06N 5/02*  (2023.01)

(52) U.S. Cl.
  CPC ............ *G06F 16/35* (2019.01); *G06F 40/279* (2020.01); *G06F 40/30* (2020.01); *G06N 5/02* (2013.01)

(58) Field of Classification Search
  CPC ........ G06F 16/35; G06F 40/279; G06F 40/30; G06N 5/02
  See application file for complete search history.

(56) References Cited

U.S. PATENT DOCUMENTS

| | | | |
|---|---|---|---|
| 11,074,412 B1 * | 7/2021 | Leeman-Munk | G06N 3/08 |
| 11,216,492 B2 | 1/2022 | Meyerzon et al. | |
| 11,468,245 B1 * | 10/2022 | Muthusamy | G06F 40/186 |

(Continued)

FOREIGN PATENT DOCUMENTS

| | | | |
|---|---|---|---|
| CA | 3017430 A1 * | 10/2016 | G06F 16/35 |

OTHER PUBLICATIONS

Du, Jiahua. Advanced Review Helpfulness Modeling. Diss. Victoria University, 2020. Retrieved from <https://vuir.vu.edu.au/41279/1/DU%20Jianhua-thesis.pdf> on May 25, 2025. (Year: 2020).*

*Primary Examiner* — Paras D Shah
*Assistant Examiner* — Oluwadamilola M Ogunbiyi
(74) *Attorney, Agent, or Firm* — Leason Ellis LLP

(57) ABSTRACT

A method of structuring entity data using a machine learning document profiling model for improved information extraction comprises: training a learning document profiling model by applying document data and identification information on different document types to the learning document profiling model; profiling entity document data using the trained learning document profiling model; generating an entity profile using the trained learning document profiling model based on the profiled document data; selecting a subset of documents comprised in the profiled document data based on the entity profile; and tagging the selected subset of documents for further processing comprising one or more of a topic extraction process, a document processing algorithm selection process, a topic importance rating process, a knowledge graph mapping process, a document signature generation process, a document querying process, and a language derivation process.

20 Claims, 9 Drawing Sheets

(56) References Cited

U.S. PATENT DOCUMENTS

| | | | |
|---|---|---|---|
| 11,769,072 B2* | 9/2023 | Kraley | G06V 30/414 |
| | | | 706/12 |
| 2007/0027859 A1* | 2/2007 | Harney | G06F 16/3334 |
| | | | 707/999.005 |
| 2011/0106807 A1* | 5/2011 | Srihari | G06F 16/288 |
| | | | 707/E17.046 |
| 2012/0215782 A1* | 8/2012 | Jagannathan | G16H 10/60 |
| | | | 707/740 |
| 2013/0097166 A1* | 4/2013 | Fink | G06F 16/35 |
| | | | 707/E17.089 |
| 2015/0254289 A1* | 9/2015 | Junkergard | G06F 16/283 |
| | | | 707/738 |
| 2016/0162467 A1* | 6/2016 | Munro | G06F 40/30 |
| | | | 704/9 |
| 2018/0012121 A1 | 1/2018 | Liu et al. | |
| 2018/0114136 A1 | 4/2018 | Kumar et al. | |
| 2018/0330231 A1 | 11/2018 | Gu et al. | |
| 2019/0012377 A1 | 1/2019 | Liu et al. | |
| 2019/0057310 A1 | 2/2019 | Olmstead et al. | |
| 2019/0108276 A1* | 4/2019 | Kovács | G06F 16/243 |
| 2020/0293902 A1 | 9/2020 | Li et al. | |
| 2020/0380385 A1 | 12/2020 | Li et al. | |
| 2021/0049169 A1 | 2/2021 | Wardell et al. | |
| 2021/0073654 A1 | 3/2021 | Ameri | |
| 2021/0110278 A1 | 4/2021 | Meyerzon et al. | |
| 2021/0182352 A1 | 6/2021 | Mallah et al. | |
| 2021/0374360 A1* | 12/2021 | Paul | G06F 40/56 |
| 2021/0382944 A1 | 12/2021 | Li et al. | |
| 2022/0019750 A1 | 1/2022 | Ravichandran et al. | |
| 2022/0237373 A1* | 7/2022 | Singh Bawa | G06F 40/20 |
| 2022/0309428 A1* | 9/2022 | Powers | G06N 20/00 |
| 2023/0035121 A1* | 2/2023 | Wei | G06F 8/427 |
| 2023/0135659 A1* | 5/2023 | Wu | G06N 3/044 |
| | | | 706/21 |
| 2023/0401386 A1* | 12/2023 | Wang | G06N 5/01 |
| 2024/0397156 A1* | 11/2024 | Belosludtcev | H04N 21/4668 |

* cited by examiner

SYSTEM, APPARATUS, AND METHOD FOR STRUCTURING DOCUMENTARY DATA FOR IMPROVED TOPIC EXTRACTION AND MODELING

FIELD

The present disclosure generally relates to data processing and, more specifically, to a system, apparatus, and method configured to process and structure documentary data for improved topic extraction and modeling.

BACKGROUND

Topic extraction broadly refers to processes of identifying topics associated with documents and unstructured data to determine semantic labeling. Correspondingly, topic modeling refers to processes of extracting hidden semantic structure in a text corpus. Topic extraction/modeling can be used in document clustering, semantic search, organizing large blocks of data, and other information retrieval.

In recent years, there has been a surge of research in unsupervised learning-based topic extraction from text corpora. Topic extraction processes typically involve analyzing the text from a semantic perspective and using various mathematical transformations and functions to determine the keywords and concepts associated with the text. The underlying mathematical techniques may map/translate the underlying words onto embedding spaces. Keywords are clustered using K-means clustering and/or other clustering approaches, often in combination with distance measures using Cosine or Euclidean distance measures. Learning is conducted on a hierarchy where latent topics exhibit an increasing level of abstraction, and learning can also be performed on distributions of words in each topic and topic distributions over a text corpus. Additionally, knowledge graphs can be used to aid in concept mapping with known information on application specific cases.

Conventional topic mining and extraction processes frequently attempt to identify only one or several keywords from a text (by mapping the keywords onto the embedding space and clustering them to identify a common topic, etc.) For example, a conventional topic extraction process typically involves a set of documents with embedded textual material ("source documents text"), being subjected to keyword extraction, where a predefined set of keywords are identified and located (or extracted) within the documents. Then, a relationship among the identified keywords within each document is determined—for example, a Dirichlet distribution of the respective keywords is determined for the set of processed documents. Finally, the documents are grouped into respective clusters based on the topics of the documents determined via the relationships among the keywords within each document.

SUMMARY

Such processes are conducted with an underlying assumption that most texts or documents being processed uniformly incorporate small numbers of keywords associated with one or more topics incorporated in the texts or documents. However, such an assumption is not realistic for the documentary data of many entities, especially financial services documents.

Furthermore, conventional topic mining processes, including machine learning processes, make universal assumptions about a standard text to work effectively (e.g., length, structure, etc.). Consequently, an algorithm designed for long research reports would not perform with the same effectiveness on short documents, such as tweets or other short social media posts. As such, universal assumptions that are made for conventional topic extraction and mining processes do not translate well to the diversity and range of documents in financial services firms.

Moreover, standard topic extraction and mining techniques do not perform well in long reference documents commonly used in financial services because such documents often incorporate multiple sections with vastly different topics and emphases. Therefore, it is difficult to extract accurate topics for documents in some cases even through clustering.

In recent years, knowledge graph embedded Latent Dirichlet Allocation (LDA) (e.g., KGE-LDA) has been proposed to improve upon LDA and other hierarchical techniques. While an underlying knowledge graph that defines the semantic relationships among underlying concepts can provide guidance on identifying meaningful topics with appropriate semantic processes, they are still inadequate in addressing the vastly difference characteristics among documents that can be processed, especially those associated with financial services.

In view of the above deficiencies of conventional topic extraction and modeling techniques, the present disclosure provides a technical solution to the problem of accurately characterizing the contents and topics in large volumes of documentary data.

According to an example implementation of the present disclosure, a computer-implemented method of structuring entity data using a machine learning document profiling model for improved information extraction, comprises: obtaining, by a processor via a communication interface, document data comprising a plurality of different document types associated with an entity from a document repository; training, by the processor, a learning document profiling model by applying at least a portion of the obtained document data and identification information on the plurality of different document types to the learning document profiling model, said training comprising: extracting, using the learning document profiling model, a plurality of document characteristics related to respective documents comprised in the applied document data, said plurality of document characteristics being selected from the group consisting of document length, document structure, semantic neighborhood, segment-level divergence, segment and document-level hierarchies, keyword frequencies, topic characteristics, structure and topic correlations, hierarchical topic divergence, criticality or importance of structural components, actionability of structural components, critical data content, language characteristics, functional characteristics, sentence structure, and information content metrics; generating a plurality of document profiles for the respective documents comprised in the applied document data based on the extracted characteristics; generating respective document type profiles for association with the plurality of different document types of the applied document data, said respective document type profiles each comprising one or more of the extracted characteristics shared by the respective documents of the plurality of different document types; and reorganizing a plurality of the respective documents comprised in the applied document data based on the extract document characteristics, the generated document profiles, and the generated document type profiles; and profiling, by the processor, the obtained document data using the trained learning document profiling model, said profiling comprising: categorizing one or more documents without a document type comprised in the profiled document data using the trained learning document profiling model, said categorizing comprising an assignment of a type to each of the one or more documents without a document type; deriving a plurality of weights for each type of documents comprised in the profiled document data using the trained learning document profiling model; generating a type profile for the each type of documents using the trained learning document profiling model, the type profile comprising the plurality of weights derived in association with the each type of documents; and generating an individual document profile for each document comprised in the profiled document data using the trained learning document profiling model, the individual document profile comprising the plurality of weights derived in association with a type of the each document; generating, by the processor, an entity profile using the trained learning document profiling model based on the profiled document data; selecting, by the processor, a subset of documents comprised in the profiled document data based on the entity profile; and tagging, in a memory communicatively connected to the processor, the selected subset of documents for further processing comprising one or more of a topic extraction process, a document processing algorithm selection process, a topic importance rating process, a knowledge graph mapping process, a document signature generation process, a document querying process, and a language derivation process based on the plurality of weights.

In one implementation, said reorganizing comprises generating definition information for modifying the identification information on the plurality of different document types.

In one implementation, the plurality of document profiles comprise correlations among at least some of the extracted document characteristics.

In one implementation, the method further comprises, prior to the training of the learning document profiling model, deriving, by the processor, one or more pre-existing document labels of the obtained document data from the document repository for applying the derived one or more pre-existing document labels with the applied document data, said one or more pre-existing document labels comprising at least one segment characteristic associated with a corresponding document.

In one implementation, the training of the learning document profiling model further comprises profiling the respective documents comprised in the applied document data based on one or more of a segment hierarchy and a component hierarchy using a segment divergence threshold.

In one implementation, the training of the learning document profiling model further comprises profiling the respective documents comprised in the applied document data based on criticality or importance of structural components using labeled data.

In one implementation, for the profiling of the obtained document data, the derived plurality of weights comprise segment importance weights for the each type of documents comprised in the processed document data.

In one implementation, one or more of the segment importance weights indicate exclusion of one or more corresponding document segments from the further processing.

In one implementation, the further processing is a recursive topic extraction process, starting with the derived plurality of weights from the profiling of the obtained data using the trained learning document profiling model, to extract one or more topics from the selected subset of documents in an iterative or recursive manner, one or more additional derived weights from one or more executions of the profiling of the obtained data using the trained learning document profiling model acting as the derived plurality of weights for a next iteration, until one or more important sections, segments, or chapters of the selected subset of documents is determined, wherein one or more of the type profiles and individual document profiles associated with the selected subset of documents are updated based on the one or more important sections, segments, or chapters.

In one implementation, the learning document profiling model comprises a neural network-based architecture with one or more components for respective one or more of document length learning, structure learning, semantic learning, topic and keyword learning and characterization, sentence structure learning, and information content learning.

According to an example implementation of the present disclosure, an apparatus for restructuring entity data using a machine learning document profiling model for improved information extraction, comprises: a communication interface adapted to communicated with a document repository; a learning document profiling model adapted to profile a plurality of different document types associated with an entity; a processor communicatively connected to the communication interface and to the learning document profiling model, said processor comprising a memory having stored therein instructions that, when executed, causes the processor to: obtain document data comprising a plurality of different document types associated with an entity from the document repository; train the learning document profiling model by applying at least a portion of the obtained document data and identification information on the plurality of different document types to the learning document profiling model, said training comprising: extracting, using the learning document profiling model, a plurality of document characteristics related to respective documents comprised in the applied document data, said plurality of document characteristics being selected from the group consisting of document length, document structure, semantic neighborhood, segment-level divergence, segment and document-level hierarchies, keyword frequencies, topic characteristics, structure and topic correlations, hierarchical topic divergence, criticality or importance of structural components, actionability of structural components, critical data content, language characteristics, functional characteristics, sentence structure, and information content metrics; generating a plurality of document profiles for the respective documents comprised in the applied document data based on the extracted characteristics; generating respective document type profiles for association with the plurality of different document types of the applied document data, said respective document type profiles each comprising one or more of the extracted characteristics shared by the respective documents of the plurality of different document types; and reorganizing a plurality of the respective documents comprised in the applied document data based on the extract document characteristics, the generated document profiles, and the generated document type profiles; and profile the obtained document data using the trained learning document profiling model, said profiling comprising: categorizing one or more documents without a document type comprised in the profiled document data using the trained learning document profiling model, said categorizing comprising an assignment of a type to each of the one or more documents without a document type; deriving a plurality of weights for each type of documents comprised in the profiled document data using the trained learning document profiling model;

generating a type profile for the each type of documents using the trained learning document profiling model, the type profile comprising the plurality of weights derived in association with the each type of documents; and generating an individual document profile for each document comprised in the profiled document data using the trained learning document profiling model, the individual document profile comprising the plurality of weights derived in association with a type of the each document; generate an entity profile using the trained learning document profiling model based on the profiled document data; select a subset of documents comprised in the profiled document data based on the entity profile; and tag, in the memory, the selected subset of documents for further processing comprising one or more of a topic extraction process, a document processing algorithm selection process, a topic importance rating process, a knowledge graph mapping process, a document signature generation process, a document querying process, and a language derivation process based on the plurality of weights.

In one implementation, said reorganizing comprises generating definition information for modifying the identification information on the plurality of different document types.

In one implementation, the plurality of document profiles comprise correlations among at least some of the extracted document characteristics.

In one implementation, the memory has stored therein further instructions that, when executed, cause the processor to derive, prior to the training of the learning document profiling model, one or more pre-existing document labels of the obtained document data from the document repository for applying the derived one or more pre-existing document labels with the applied document data, said one or more pre-existing document labels comprising at least one segment characteristic associated with a corresponding document.

In one implementation, the training of the learning document profiling model further comprises profiling the respective documents comprised in the applied document data based on one or more of a segment hierarchy and a component hierarchy using a segment divergence threshold.

In one implementation, the training of the learning document profiling model further comprises profiling the respective documents comprised in the applied document data based on criticality or importance of structural components using labeled data.

In one implementation, for the profiling of the obtained document data, the derived plurality of weights comprise segment importance weights for the each type of documents comprised in the processed document data.

In one implementation, one or more of the segment importance weights indicate exclusion of one or more corresponding document segments from the further processing.

In one implementation, the memory has stored therein further instructions that, when executed, cause the processor to execute a recursive topic extraction process, starting with the derived plurality of weights from the profiling of the obtained data using the trained learning document profiling model, to extract one or more topics from the selected subset of documents in an iterative or recursive manner, one or more additional derived weights from one or more executions of the profiling of the obtained data using the trained learning document profiling model acting as the derived plurality of weights for a next iteration, until one or more important sections, segments, or chapters of the selected subset of documents is determined, wherein one or more of the type profiles and individual document profiles associated with the selected subset of documents are updated based on the one or more important sections, segments, or chapters.

In one implementation, the learning document profiling model comprises a neural network-based architecture with one or more components for respective one or more of document length learning, structure learning, semantic learning, topic and keyword learning and characterization, sentence structure learning, and information content learning.

BRIEF DESCRIPTION OF THE DRAWINGS

Various example implementations of this disclosure will be described in detail, with reference to the following figures, wherein.

DETAILED DESCRIPTION

The following example implementation is described based on topic extraction and modeling features of which may be incorporated into other types of data (e.g., documentary data) processing without departing from the spirit and the scope of the disclosure.

The present disclosure is directed to a technique for profiling documentary data for improvements on subsequent processing of such data. The data profiling is applicable to characterizing and customizing the subsequent processing to improve its accuracy, efficiency, performance, etc.

Figure 1:
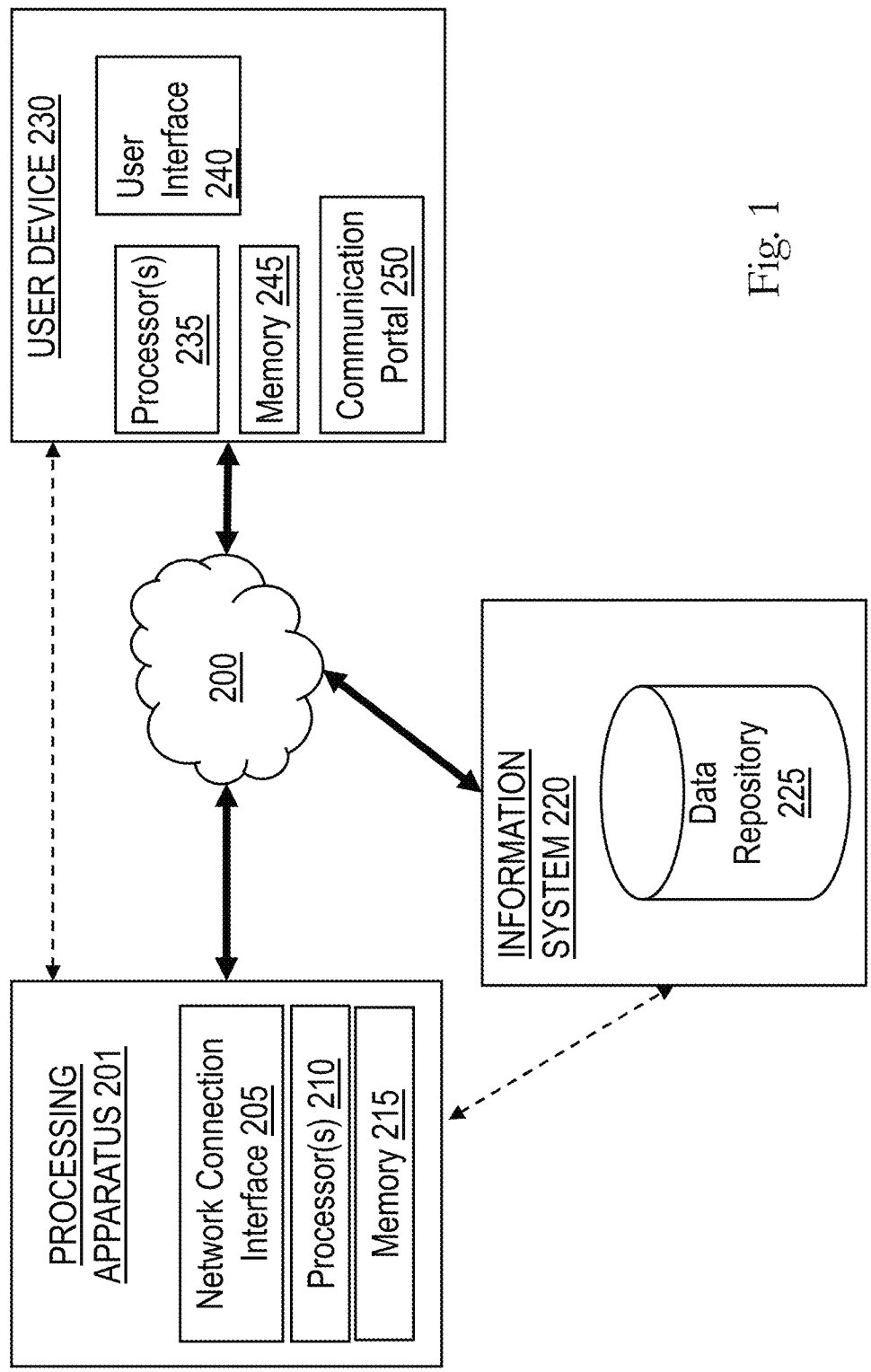
FIG. 1 is a schematic diagram showing a system for implementing a documentary data profiling technique according to an exemplary embodiment of the present disclosure.

FIG. 1 is a schematic diagram of a system for implementing a documentary data profiling technique according to an exemplary embodiment of the present disclosure.

As shown in FIG. 1, a data communication network 200 is incorporated for communicatively connecting a processing apparatus 201, an information system 220, and a user device 230 with one another. The network 200 can be the Internet, an intranet network, a local area network, other wireless or other hardwired connection or connections, or a combination of one or more thereof, by which the aforementioned entities can communicate. Communications systems for facilitating network 200 can include hardware (e.g., hardware for wired and/or wireless connections) and/or software, and the communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Computer systems can communicate with other computer systems or devices directly and/or indirectly, e.g., through a data network, such as the Internet, a telephone network, a mobile broadband network (such as a cellular data network), a mesh network, Wi-Fi, WAP, LAN, and/or WAN, to name a few. For example, network(s) 200 can be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), which are some of the various types of protocols that can be used to facilitate communications between user device 230 and processing apparatus 201. According to an exemplary embodiment of the present disclosure, network 200 is comprised of switches (not shown), routers (not shown), and other computing devices (not shown) for facilitating communications and data exchanges among servers, such as processing apparatus 201 and information system 220, and clients, such as user device 230, while conforming to the above-described connections and protocols as understood by those of ordinary skill in the art.

Processing apparatus 201 manages the training and deployment processes for the documentary data profiling of the present disclosure. In implementations, processing apparatus 201 embodies one or more of an application server, a network management apparatus, a data management system, and the like. In embodiments, the document profiling process of the present disclosure is applicable to any data management system incorporated in processing apparatus 201 for managing any documentary data processing tasks.

In some implementations, the system architecture is language neutral allowing REST, JSON and Secure Socket Layers to provide the communication interface between the various computing devices (e.g., 201, 220, and 230). Further, in one or more implementations, the architecture is built on the open secure socket layers, JSON, and/or REST APIs. Accordingly, the disclosed systems for document profiling and associated processing can implement open standards, thereby allowing interoperability. It should be further understood that while the various computing devices and machines referenced herein, including but not limited to processing apparatus 201, information system 220, and user device 230, are referred to herein as individual/single devices and/or machines, the referenced devices and machines, and their associated and/or accompanying operations, features, and/or functionalities can be combined or arranged or otherwise employed across any number of devices and/or machines, such as over a network connection or wired connection, as is known to those of skill in the art. Correspondingly, functionality for any multiple entities can be combined and incorporated to a single apparatus without departing from the spirit and scope of the present disclosure. It should be further understood that network 200 can be communicatively coupled to plural user devices (e.g., 230-z), processing apparatuses 201, and/or information systems 220.

In some embodiments, user device 230 and processing apparatus 201 can communicate with one another via a web browser using HTTP. Various additional communication protocols can be used to facilitate communications between user device 230 and processing apparatus, include the following non-exhaustive list, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, FTP, RTP, RTSP, and/or SSH.

Figure 2:
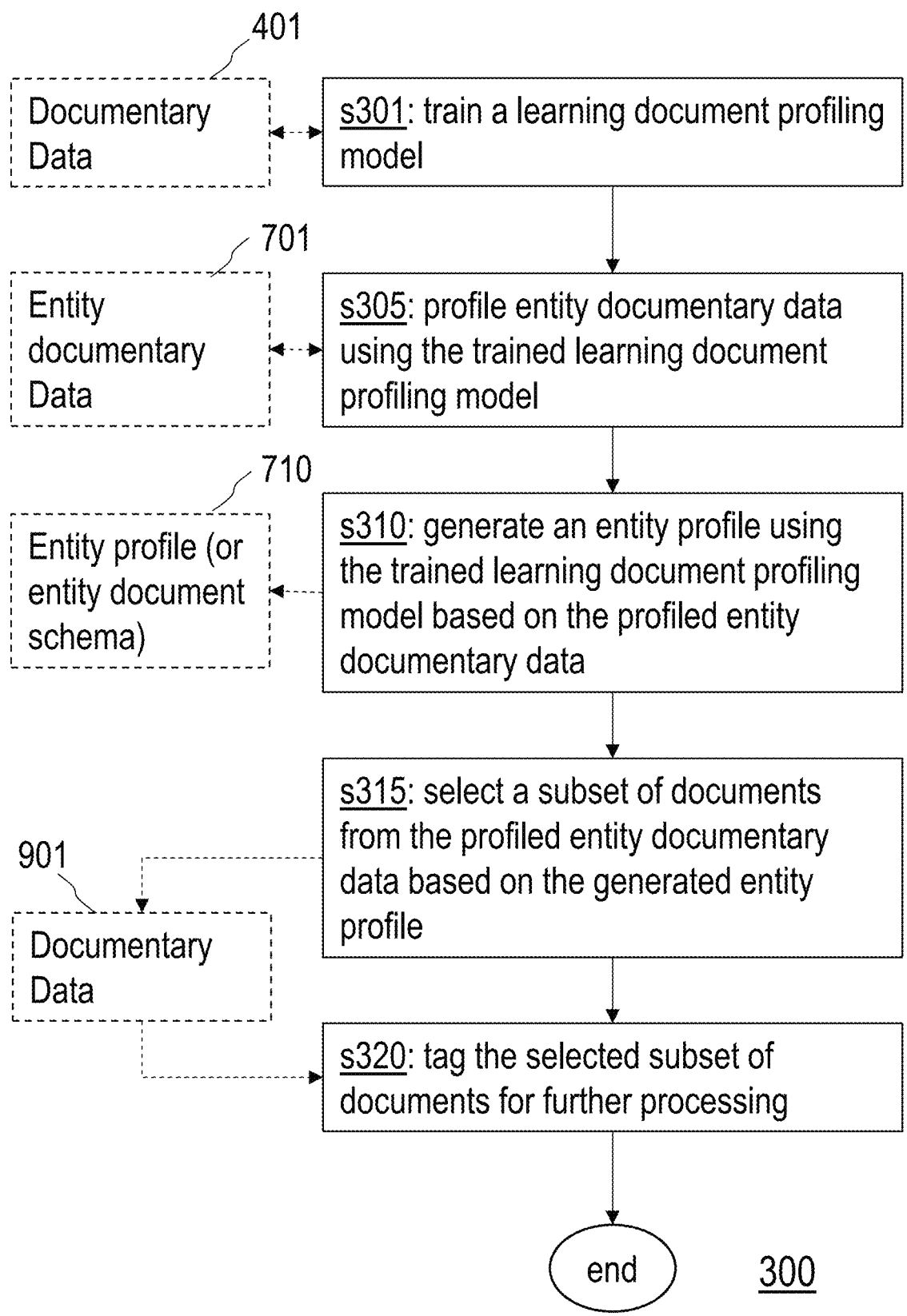
FIG. 2 is a flow diagram of a document profiling process in accordance with an example implementation of the present disclosure.

Correspondingly, as shown in FIG. 2, processing apparatus 201 incorporates communications circuitry ("Network Connection Interface") 205, one or more processor(s) 210, and a memory 215.

Network connection interface 205 can include any circuitry allowing or enabling one or more components of processing apparatus 201 to communicate with one or more additional devices, servers, and/or systems over network 200—for example, one or more of information system 220 and user device 230. Network connection interface 205 can use any of the previously mentioned exemplary communications protocols. According to an exemplary embodiment, network connection interface 205 comprises one or more universal serial bus ("USB") ports, one or more Ethernet or broadband ports, and/or any other type of hardwire access port to communicate with network 200 and, accordingly, information system 220 and user device 230.

One or more processor(s) 210 can include any suitable processing circuitry capable of controlling operations and functionality of processing apparatus 201, as well as facilitating communications between various components within processing apparatus 201. In some embodiments, processor(s) 210 can include a central processing unit ("CPU"), a graphic processing unit ("GPU"), one or more microprocessors, a digital signal processor, or any other type of processor, or any combination thereof. In some embodiments, the functionality of processor(s) 210 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 210 can include its own local memory, which can store program systems, program data, and/or one or more operating systems.

Memory 215 can include one or more types of storage mediums such as any volatile or non-volatile memory, or any removable or non-removable memory implemented in any suitable manner to store data for processing apparatus 201. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 9301 can be implemented as computer-readable storage media ("CRSM"), which can be any available physical media accessible by processor(s) 210 to execute one or more instructions stored within memory 215. According to an exemplary embodiment, one or more applications corresponding to the document profiling and associated processing, including the data and network structures illustrated in FIGS. 4, 7, and 9-10, are executed by processor(s) 210. In embodiments, the instructions and data associated with these processes can be stored in memory 215 and/or at information system 220.

According to an example implementation of the present disclosure, processing apparatus 201 is in communication with information system 220 via direct connection and/or via network 200. As illustrated in FIG. 2, information system 220 maintains data repository 225, which can incorporate one or more database(s) embodied in servers and corresponding storage media for storing documentary and associated data for an entity—such as a financial services firm or one or more departments thereof. Correspondingly, in embodiments, processing apparatus 201, user device 230, and at least a part of network 200 can be maintained by and/or associated with the entity. According to an exemplary embodiment, the data stored at data repository 225 includes, but is not limited to, system design documents, compliance guideline documents, legal agreement and contract documents, technical reference documents, research reports, white papers, support and guide documents, financial statements, regulatory guidelines, electronic communications (e.g., chat messages, emails, social media messages, etc.), operational documents, functional and line of business (LOB)-specific documents, news reports and news source items, technical and architectural reference documents, policy documents, knowledge graphs, labelled machine learning (ML) data, document categorization data, and uncategorized documents.

Exemplary storage media for the data storage of data repository 225 correspond to those described above with respect to memory 215, which will not be repeated here. In embodiments, information system 220 can incorporate a database management system (DBMS) and be comprised of one or more database servers that support Oracle SQL, NoSQL, NewSQL, PostgreSQL, MySQL, Microsoft SQL Server, Sybase ASE, SAP HANA, DB2, and the like. Information system 220 incorporates a network connection interface (not shown) for communications with network 200 and exemplary implements of which can include those described above with respect to network connection interface 205, which will not be repeated here.

In embodiments, processing apparatus 201 and/or information system 220 can implement an application server adapted to host one or more applications that are accessible and executable over network 200 by one or more users (user #1 . . . user #z) at respective user devices 230 (e.g., 230-1 . . . 230-z) (not shown). In embodiments, executable portions of applications maintained at the application server can be offloaded to the user device 230.

User device 230 (or 230-1 . . . 230-z) can be any computing device and/or data processing apparatus capable of embodying the systems and/or methods described herein and can include any suitable type of electronic device including, but not limited to, desktop computers, mobile computers (e.g., laptops, ultrabooks), mobile phones, portable computing devices, such as smart phones, tablets, personal display devices, personal digital assistants ("PDAs"), virtual reality devices, wearable devices (e.g., watches), to name a few, with network (e.g., Internet) access that is uniquely identifiable by Internet Protocol (IP) addresses, Internet cookies, Media Access Control (MAC) identifiers, or online personal accounts of individual users (e.g., entity account of a user), either directly or through another personal device.

As shown in FIG. 2, user device 230 includes processor(s) 235, memory 245, communication portal 250, and user interface 240. Processor(s) 235, memory 245, and communication portal 250 can be implemented in accordance with the exemplary implementations for processor(s) 210, memory 215, and network connection interface 205, respectively, and will not be repeated here. Communications portal 250 can use any communications protocol, such as any of the previously mentioned exemplary communications protocols. In some embodiments, user device 230 can include one or more antennas to facilitate wireless communications with a network using various wireless technologies (e.g., Wi-Fi, Bluetooth, radiofrequency, etc.). In yet another embodiment, user device 9400-1 can include one or more universal serial bus ("USB") ports, one or more Ethernet or broadband ports, and/or any other type of hardwire access port so that communications portal 250 allows user device 230 to communicate with another user device (not shown) or with one or more communications networks, including network 200. In embodiments, user device 230 can access network 200 via a virtual private network ("VPN") tunnel through an external network (not shown). Such tunnels can employ Layer 2 Tunneling Protocol (L2TP) and the like.

Additionally, processor(s) 235 can execute an operating system ("OS") for user device 230, and/or one or more firmware applications and/or applications resident thereon in correspondence with processing apparatus 201. In some embodiments, processor(s) 235 can run a local client script for reading and rendering data received from processing apparatus 201 and/or information system 220.

User interface 240 is operatively connected to processor(s) 235 and can include one or more input or output device(s), such as switch(es), button(s), key(s), a touch screen, a display, microphone, camera(s), sensor(s), etc. as would be understood in the art of electronic computing devices.

Figure 3:
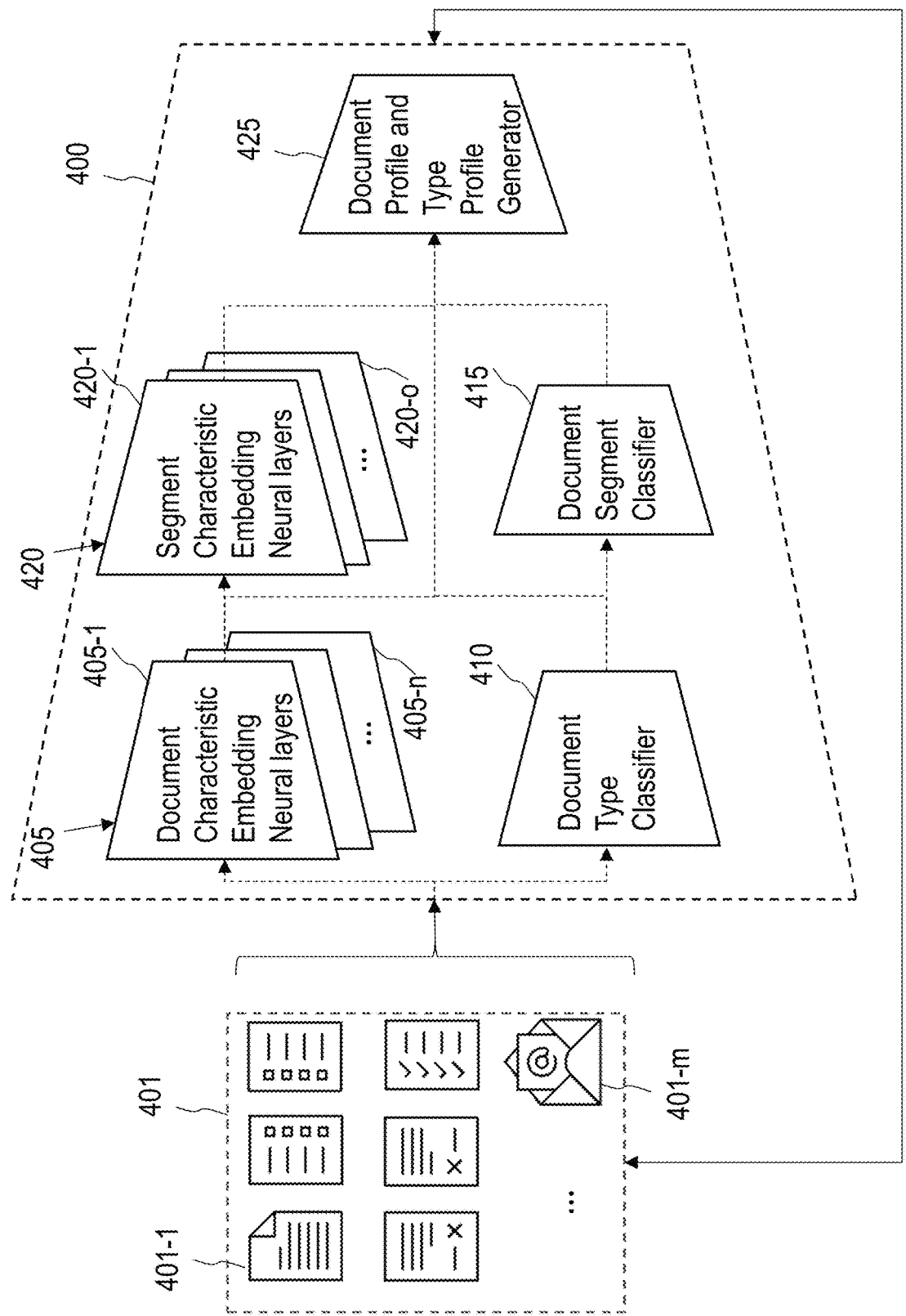
FIG. 3 is a schematic diagram showing a network structure of a learning document profiling model for performing the document profiling process of FIG. 2 according to an example implementation of the present disclosure.
Figure 4:
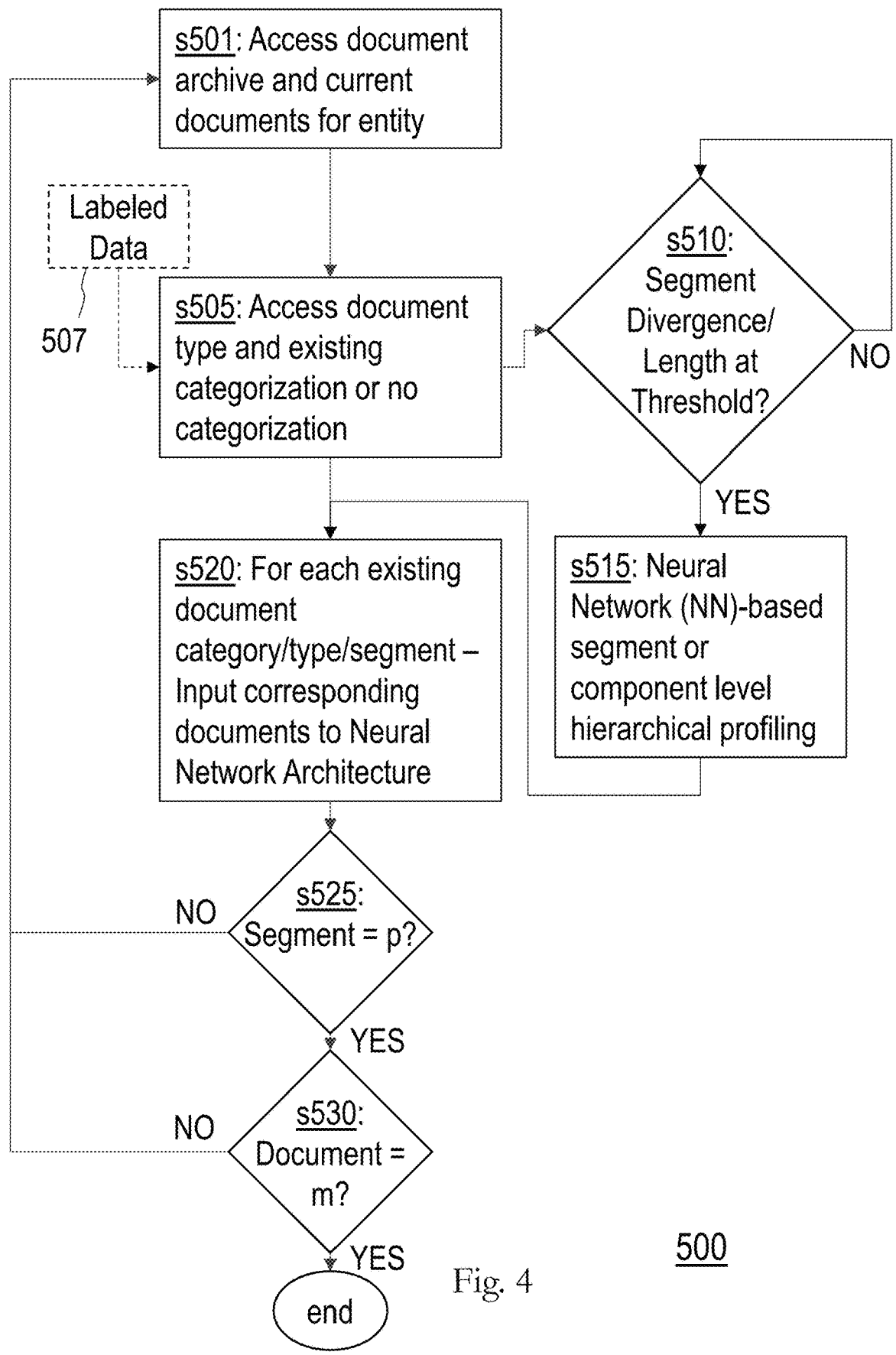
FIG. 4 is a flow diagram of a training data collection process for training the document profiling model of FIG. 3 in accordance with an example implementation of the present disclosure.
Figure 5:
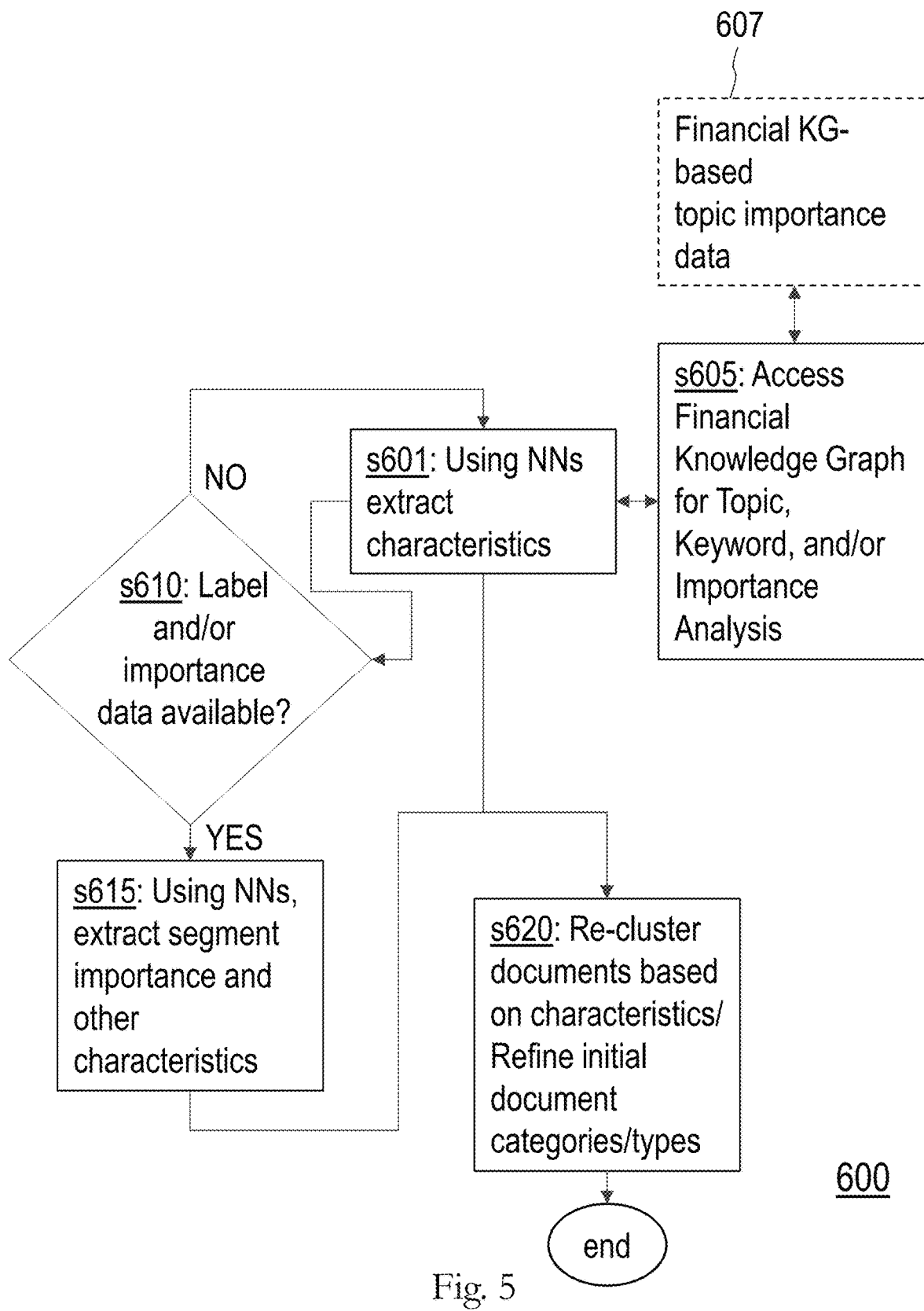
FIG. 5 is a flow diagram of a training process for the document profiling model of FIG. 4 in accordance with an example implementation of the present disclosure.
Figure 6:
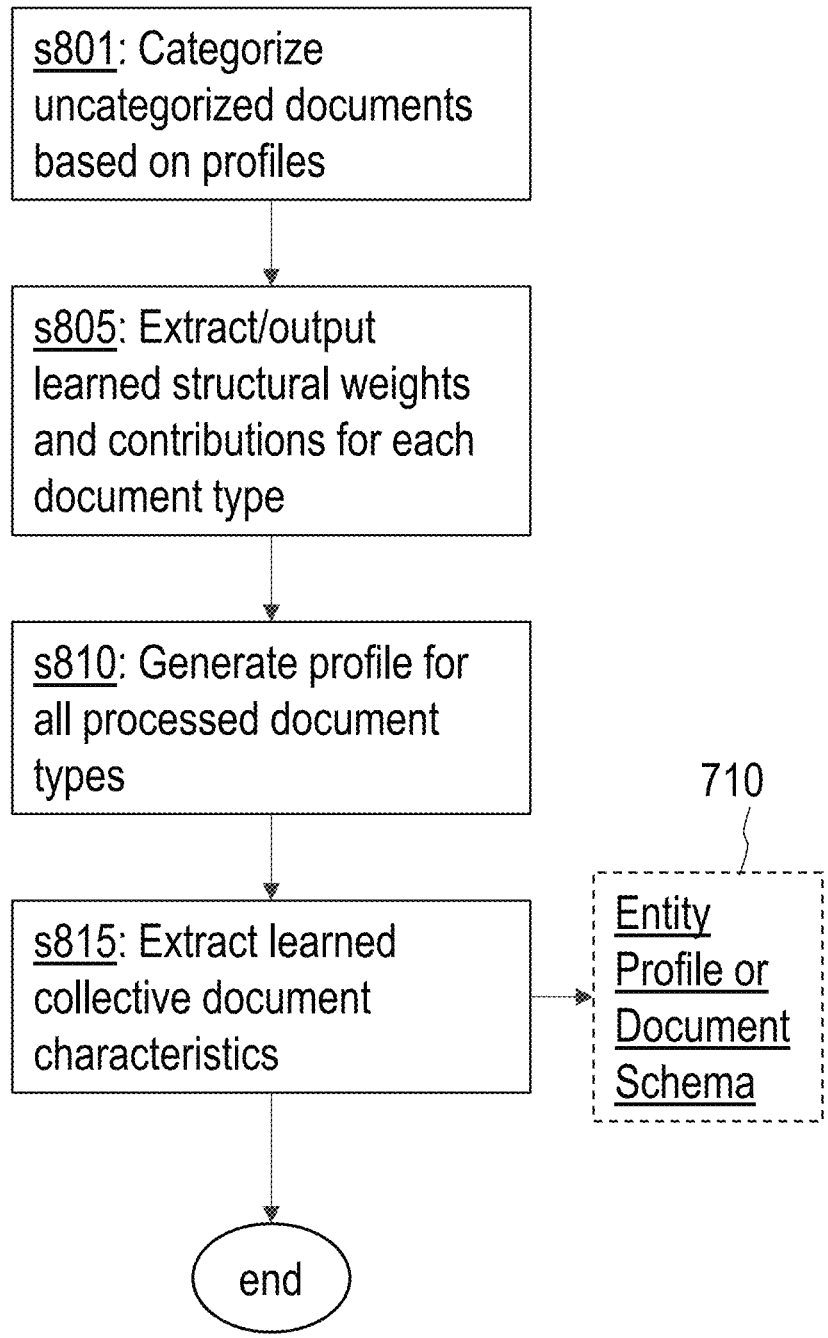
FIG. 6 is a flow diagram of a deployment process of using a trained document profiling model in accordance with an example implementation of the present disclosure.

FIG. 2 is a flow diagram of a document profiling process 300 in accordance with an example implementation of the present disclosure. As shown in FIG. 2, process 300 incorporates steps s301, s305, s310, s315, and s320, each of which will be described in further detail below with reference to FIGS. 3-6, respectively. FIG. 3 illustrates a network structure for performing an initial training step s301 of process 300 according to one example implementation of the present disclosure and FIGS. 4 and 5 illustrate processes for conducting this initial training step s301. FIG. 6 illustrates a process for conducting a document profiling step s305 and an entity profile generating step s310.

In embodiments, process 300, along with the network structure illustrated in FIG. 3, can be executed, in part or in the whole, by processing apparatus 201, user device 230, and/or information system 220. The data resulting from these processes, including the ML training, can, likewise, be maintained, in part or in the whole, by information system 220, processing apparatus 201, and/or user device 230. Correspondingly, the processes and data related to the document profiling process (e.g., the deployment of the document profiling model at steps s305-s320, along with their associated process steps) can be executed/maintained, in part or in the whole, by information system 220, processing apparatus 201, and/or user device 230.

As illustrated in FIG. 2, process 300 initiates with step s301 of training a learning document profiling model 400 using documentary data 401. As an example, documentary data 401 includes a plurality of documents (e.g., 401-1 . . . 401-m illustrated in FIG. 3) that form a subset of documents maintained by an entity (e.g., at data repository 225).

According to an example implementation, the learning document profiling model is a machine learning (ML) model trained and adapted to profile documentary data 401 (and m represents a sample size acceptable in the ML industry to form a data set for training).

FIG. 3 is a schematic diagram of a network structure for a learning document profiling model 400 for performing process 300, including training step s301, shown in FIG. 2 according to an example implementation of the present disclosure. Again, document profiling model 400 and its constituent elements described below can be executed, in part or in the whole, by processing apparatus 201, user device 230, and/or information system 220. The data resulting from executing document profiling model 400 (or its respective constituent elements), including the ML training, can, likewise, be maintained, in part or in the whole, by information system 220, processing apparatus 201, and/or user device 230.

As illustrated in FIG. 3, documentary data 401 (e.g., 401-1 . . . 401-m) includes a plurality of different types of documents. In embodiments, documentary data 401 can include system design documents, compliance guideline documents, legal agreement and contract documents, technical reference documents, research reports, white papers, support and guide documents, financial statements, regulatory guidelines, electronic communications (e.g., chat messages, emails, social media messages, etc.), operational documents, functional and line of business (LOB)-specific documents, news reports and news source items, technical and architectural reference documents, policy documents, knowledge graphs, labelled machine learning (ML) data, document categorization data, uncategorized documents, and the like. Documentary data 401 is input to learning document profiling model 400 for profiling the respective types of documents and the respective individual documents (e.g., 401-1 . . . 401-m) based on a number of characteristics.

According to an example implementation, document profiling model 400 is adapted to a financial services application and incorporates a reconfigurable neural network-based system (or "machine learning network"). In embodiments, document profiling model 400 can include any number of algorithmic sub-components, including but not limited to convolutional, recurrent, Boltzmann, multi-level perceptron, and other machine learning algorithms, together with adaptive connectivity and parameters that can be reconfigured based on performance or other factors. The various machine learning algorithms employed can be supervised, semi-supervised or unsupervised. In the case of supervised machine learning algorithms, the document profiling model 400 learns from the correlation between, for example, raw documentary data and labelled data and various characteristics among identified types of documents and individual documents. In embodiments, labelled data can include manual topic extractions, categorizations, partial labels, and data input as part of active human supervision to name a few. Machine learning networks can be employed instead of a predefined condition or parameter to determine, at least in part, the types and characteristics of the documents (e.g., 401-1 . . . 401-m) included in documentary data 401. Regardless of the kind of machine learning model, the document profiling model 400 incorporates data preprocessing, data normalization, feature extraction, feature selection, as well as other steps required to obtain a complete and fully operational machine learning system, as would be understood by those of ordinary skill in the art.

In accordance with an example implementation and as shown in FIG. 3, documentary data 401 is received and processed by a plurality of document characteristic embedding neural layers 405 (e.g., 405-1 . . . 405-n) that are fully connected (dense) neural layers to learn dense document-level characteristic embeddings, which result in representations (e.g., various data structures such as vector, matrices, knowledge graphs, and the like) (not shown) of the respective document-level characteristics. (n represents a number of neural layers acceptable in the ML industry for the document characteristic embeddings). According to one example implementation, the document characteristic representations (not shown) include, without limitation, those for document length, segmentation, keyword distribution, topic distribution, segment contributions/weights, segment hierarchy, to name a few. These representations form a basis for determining a document type profile for each type of document included in documentary data 401 by a document type profile classifier 410, which classifies the documents (e.g., 401-1 . . . 401-m) included in documentary data 401 based on their respective characteristics.

Accordingly, the document types and characteristics further form bases for classifying one or more segments that are included in each document type included in documentary data 401 by a document segment classifier 415. In one implementation, document segment classifier 415 identifies the one or more segments of each document (e.g., 401-1 . . . 401-m) for processing by segment characteristic embedding neural layers 420 (e.g., 420-1 . . . 420-o) incorporated in model 400 to learn dense segment-level characteristics associated with each of the one or more segments included in each document type and individual document. (o represents a number of neural layers acceptable in the ML industry for the segment characteristic embeddings). In embodiments, document segment classifier can incorporate one or more threshold-based segment divergence and/or segment length determination processors for dividing each document (e.g., 401-1 . . . 401-m) into respective one or more segments for processing by segment characteristic embedding neural layers 420.

In embodiments, segment characteristic representations can, in turn, form at least partial bases for document-level characteristic determinations—for example, for determining segment hierarchy, segment importance, etc., for each document type and, thus, its corresponding type profile. In other words, segment characteristics determined by the segment characteristic embedding layers 420 can inform segment hierarchy and segment importance determinations by document characteristic neural layers 405 and, in turn, document type profile classifier 410. The learned document types, document-level characteristics, identified segments, and segment-level characteristics collectively form a basis for determining a document profile and a corresponding document type profile for each document (e.g., 401-1 . . . 401-m) included in documentary data 401. In accordance with an example implementation, a document profile and document type profile generator 425 is incorporated in document profiling model 400 for generating individual document profiles and document type profiles for respective documents (e.g., 401-1 . . . 401-m) in documentary data 401 based on the aforementioned characteristics of each document.

In accordance with an example implementation of the present disclosure, document-level and segment-level characteristics that are classified by respective neural layers 405 and 420 include, but are not limited to: document length, document structure, semantic neighborhood/Knowledge Graph (KG) mapping, segment-level divergence, segment-level and document-level hierarchical analyses (e.g., for long documents)—such as keyword frequencies and distribution, topic characteristics, distribution, structure, and correlations (e.g. abstract of a research report holds more critical information), hierarchical topic divergence, criticality or importance of structural components (e.g., segment contribution), actionability of structural components, critical data content (such as Personally Identifiable Information (PII) and National Provider Identifier (NPI)), language characteristics, functional characteristics (observation, arguments, statement, action item, guidance, specification, results, analysis), semantic characteristics, sentence structure characteristics, Information content metrics (Shannon and other metrics), etc.

According to one implementation, length, structure, and known format matches are incorporated in document characteristic embedding neural layers 405 and document segment classifier 415 for identifying respective one or more segments in each document (e.g., 401-1 . . . 401-m). Additionally, neural layers 405 further learn embeddings for topic coverage, topic diversity keyword diversity, and keyword frequency. For each identified segment, neural layers 420 learn corresponding embeddings on topic characteristics per segment and keyword characteristics per segment. Thus, in embodiments, these characteristics can inform neural layers 405 as feedback on learning embeddings on segment hierarchy, segment contribution, actionability of segment characteristics, and the like.

As should be understood by one of ordinary skill in the art, classifiers 410 and 415 and profile generator 425 can incorporate ensembles of multiple classifiers that are combined in one of various ways, such as classifier stacking and the like, and, in one implementation, form multi-class discriminators (e.g., classification neural networks) that employ any machine learning (ML) model, including but not limited to dense neural networks, convolutional neural networks, transformers, etc.

Regardless of the architecture type, in embodiments, the neural networks of document profiling model 400 can be trained by using stochastic gradient descent (SGD) or other algorithms to minimize loss function. According to one implementation of the present disclosure, the training process is an iterative process that is based on alternating two steps, a forward pass and backward pass, until the prediction error of model 400 is sufficiently low. In the forward pass, documentary data 401 (or training data) is passed through model 400 to generate predictions (e.g., predicted class labels). In the backward pass, errors of the predictions are used to update and improve model 400 and reduce its errors. To update the weights of model 400, the errors are back-propagated through the network. After a number of iterations (epochs) over the training data (or documentary data) 401, the weights of document profiling model 400 approach values that minimize the prediction errors on the training data set.

In embodiments, discrete document profiling models conforming to model 400 can be implemented for respective predefined document types and/or categories. In such embodiments, documentary data 401 can incorporate documents of those respective predefined document types/categories for training the respective discrete profiling models (400). Additionally, learned types/categories can also be accounted for by such discrete models (400)—for example, by customizing one or more models conforming to model 400 based on training on documentary data 401 that does not include any predefined types or categories.

FIG. 4 is a flow diagram of a training data collection process 500 for training document profiling model 400 in accordance with an example implementation of the present disclosure. According to an exemplary embodiment, process 500 is conducted by one or more of processing apparatus 201, user device 230, and information system 220 that are configured by code to perform the process steps using an execution of document profiling model 400.

As illustrated in FIG. 4, process 500 initiates with steps s501 of accessing (e.g., by processing apparatus 201, user device 230, and/or information system 220) a document archive and current documents (e.g., maintained at data repository 225) for an entity (e.g., a financial institution). In an example implementation, training documentary data 401 embodies the document archive and current documents accessed at step s501, which data 401 is obtained via information system 220 (e.g., by processing apparatus 201 and/or user device 230). Next, at step s505, document types and any categorizations (e.g., regulatory guidelines, technology references) of documentary data 401 is accessed, which is also retrieved from data repository 225 via information system 220 according to an example implementation. As described before, the type and categorization data can include labeled data 507, such as data from manual topic extractions, manual categorizations, partial labels, active human supervision, and the like.

With the retrieved documentary data 401 and any existing categorization data, process 500 proceeds next to step s510, where a determination is made (e.g., by processing apparatus 201, user device 230, and/or information system 220) on a segment divergence or segment length threshold for identifying one or more segments included in a document (e.g., 401-1 . . . 401-m) included in documentary data 401 being processed. According to an example implementation, step s510 is performed using document segment classifier 415 (e.g., by processing apparatus 201, user device 230, and/or information system 220) based on, inter alia, document characteristic representations from neural layers 405 and document type classifier 410. In one implementation, labeled data 507 is incorporated with documentary data 401 for training the document characteristic representations in training document type classifier 410 and document segment classifier 415. In one implementation, step s510 is repeated ("NO") until at least one segment is identified by segment classifier 415 in the documentary data 401.

Once a segment is identified ("YES"), at step s515, a neural network (NN)-based segment or component level hierarchical profiling is conducted (e.g., by processing apparatus 201, user device 230, and/or information system 220). According to one example implementation, step s515 is conducted using segment characteristic embedding neural layers 420 and document characteristic embedding neural layers 405, which generate characteristic representations inclusive of a segment or component level hierarchy of a document that is, in turn, suitable for training document type classifier 410 and document segment classifier 415. Correspondingly, the representations form a basis for the generation of document and document type profiles by generator 425 for the document containing the segment involved in the hierarchical profiling of step s515.

Process 500 proceeds next to step s520 of inputting corresponding documents with existing document categories, types, and/or segments to a neural network architecture (e.g., document profiling model 400) for training in document profiling. In one example implementation, step s520 is performed (e.g., by processing apparatus 201, user device 230, and/or information system 220) for training document profiling model 400 to characterize documents based on topic characteristics. It should be understood by one of ordinary skill in the art that other documentary characteristics can be used for such training without departing from the spirit and scope of the present disclosure.

According to an exemplary embodiment, the document and segment profiling is conducted based on a hierarchical process where steps s501 through s520 are performed in a recursive or iterative manner for processing each segment or component (not shown) included in each retrieved document (e.g., 401-1 ... 401-$m$) that is being processed. Thus, at step s525, a determination is made whether a determined total number of segments ("Segment=p?") has been processed for a particular document (e.g., 401-1 ... 401-$m$) and if not ("NO"), process 500 returns to step s501 for a next segment in the particular document. (p represents the determined total number of segments for the document). Correspondingly, once a particular document has been processed ("YES") a determination is made on whether all of retrieved documents have been processed ("Document=m"?) at step s530. If not ("NO"), process 500 returns to step s501 for a next segment in the particular document. Process 500 concludes when the final retrieve document has been processed ("YES").

FIG. 5 is a flow diagram of a training process 600 for document profiling model 400 in accordance with an example implementation of the present disclosure. According to an exemplary embodiment, process 600 is conducted by one or more of processing apparatus 201, user device 230, and information system 220 that are configured by code to perform the process steps using an execution of document profiling model 400. Process 600 follows the completion of training data collection process 500 for a set of retrieved documents (e.g., 401-1 ... 401-$m$) and initiates with a characteristic extraction step s601 using neural networks (NN) (e.g., document profiling model 400). As described before, in embodiments, neural layers 405 and 420 can be used to extract respective characteristics at document and segment levels, respectively—such characteristics including, but not limited to: length, segmentation, keyword distribution, topic distribution, segment contribution, etc.

With the extracted characteristics, process 600 proceeds to step s605, where topic, keyword, and/or importance data at a document level and/or at a segment level is accessed—for example, via information system 220 by processing apparatus 201 and/or user device 230. According to one example implementation, financial knowledge graph (KG)-based topic importance data 607 is retrieved (e.g., via information system 220) for training document profiling model 400.

Next, at step s610, a determination is made (e.g., by processing apparatus 201, user device 230, and/or information system 220) on whether labeled data and/or importance data is available for a document (e.g., 401-1 ... 401-$m$) based on step s605. If no such data is available ("NO"), process 600 returns to step s601 for a next document or segment. If importance or labeled data is available ("YES"), process 600 proceeds to step s615, where such data is used for extracting segment importance and other characteristics for documentary data 401. In certain embodiments, the accessed data from step s605 is incorporated with documentary data 401 for characteristic extraction by neural layers 405 and 420 (e.g., step 615) and, in turn, for training document type classifier 410 and segment classifier 415. Correspondingly, generator 425 can generate respective individual document and document type profiles that reflect respective extracted characteristics, including topic importance and corresponding segment contributions, etc.

Process 600 concludes with step s620 of re-clustering documents based on the characteristics of the documents (e.g., 401-1 ... 401-$m$). Correspondingly, the document categories and/or types are refined as classifiers 410 and 415 are trained based on the characteristics. In an example implementation, the re-clustering is conducted based on document and type profiles generated by generator 425, which are generated based upon the extracted characteristics and corresponding refined categories/types. Thus, the training of document profiling model 400 is conducted in a recursive or iterative manner so that documentary data 401 and model 400 reach a steady state of document clustering and document/segment classification, respectively (the number of iterations per document/segment is a number acceptable to the ML industry for reaching such a steady state). According to one implementation, the re-clustering is performed by one or more of processing apparatus 201, user device 230, and information system 220 to update documentary data 401 maintained at data repository 225.

Referring back to FIG. 3, after training of document profiling model 400 using documentary data 401 has reached an acceptable state, or completed, (step s301), document profiling process 300 proceeds next to the deployment of document profiling model 400, which includes step s305 of profiling entity documentary data 701 using the trained learning document profiling model 400 and step s310 of generating an entity profile (or entity document schema) 710 based on the profiled characteristics of documentary data 701.

In accordance with an exemplary implementation, documentary data 701 represents a collection of data associated with an entity—such as a financial services firm, a department thereof, or the like-maintained at data repository 225 by information system 220. In an exemplary embodiment, document profiling model 400 is executed, in part or in the whole, by one or more of processing apparatus 201, user device 230, and information system 220 for profiling the documentary data 701 and generating an entity profile in connection with the profiled documentary data. The data resulting from executing document profiling model 400 can, likewise, be maintained, in part or in the whole, by information system 220, processing apparatus 201, and/or user device 230.

In accordance with one example implementation, documentary data 701 (or document collection 701-1 ... 701-$q$; not shown) is retrieved from data repository 225, via information system 220, for profiling by document profiling model 400. (q represents a total number of document collections maintained on behalf of an entity). For example, such documentary data 701 can be inputted in the manner illustrated for documentary data 401 in FIG. 3. In one implementation, the profiling of documentary data 701 by model 400 is conducted in a recursive or iterative manner until at least a document type profile or an individual document profile has been generated for each document (e.g., 701-1 ... 701-$q$) (not shown) included in documentary data 701. In one example embodiment, processes 500 and 600 are conducted in the recursive or iterative manner for documentary data 701 based on determined segment and topic hierarchies resulting from the training and profiling steps s301 and s305.

Once at least a document type profile or an individual document profile has been generated for each document in the documentary data 701, an entity profile (e.g., entity document schema) 710 (illustrated in FIGS. 2 and 6) associated with documentary data 701 is generated based at least in part on the collective profiles for documentary data 701 generated by document profiling model 400. In one embodiment, the entity is a financial services firm and the generated entity profile (e.g., entity document schema) 710 comprises an entity document vocabulary, important keywords, typology, ontology, or the like, and is incorporated to documentary data 701 as an update thereto at data repository 225 (e.g., by processing apparatus 201, user device 230, and/or information system 220) for the entity.

FIG. 6 is a flow diagram of a deployment process 800 of using trained document profiling model 400 in accordance with an example implementation of the present disclosure. According to an exemplary embodiment, process 800 is conducted by one or more of processing apparatus 201, user device 230, and information system 220 that are configured by code to perform the process steps using an execution of document profiling model 400.

As illustrated in FIG. 6, process 800 initiates with steps s801 of categorizing all uncategorized documents included in documentary data 701 based on respective determined profiles for such documents using document profiling model 400. In one implementation, with reference to FIG. 3, documentary data 701 is passed through document profiling model 400 (e.g., in the manner illustrated for documents 401-1 . . . 401-*m*) for classifying respective document types for each uncategorized document, determining document and segment-level characteristics, and generating document and type profiles for each uncategorized document.

Next, at step s805, structural weights and contributions for each document type, including respective one or more segments thereof, are extracted (or outputted). In one example implementation, one or more of steps s515 and s615 of processes 500 and 600 are executed for extracting the respective weights and contributions. Thus, in example implementations, the document profiling model 400 is continually trained while extracting the structural weights and contributions—in other words, one or more steps of processes 500 and 600 can be executed for conducting steps s801 and s805 of process 800.

As discussed before, processes 500 and 600 incorporate recursive or iterative processes for learning respective document or segment profiles of documentary data (e.g., 401 and 701) and for processing (e.g., re-clustering) the documentary data. Correspondingly, at step s810, a profile for all processed document types is generated. In one implementation, document profile and type profile generator 425 outputs all, or a portion of, type and document profiles related to all processed documents for documentary data 701. Next, process 800 concludes with step s815, where the collective characteristics of documentary data 701 learned by document profiling model 400 is extracted to form an overall entity (e.g., financial services firm) profile and to generate an entity document schema 710 representing the document characteristics associated with the entity. In one implementation, entity document schema 710 is returned to data repository 225 (and/or information system 220) for providing an overall entity profile (or schema) for documentary data 701 associated with the entity in aid of further processing of the data. In embodiments, discrete document profiling models conforming to model 400 can be implemented for respective predefined document types and/or categories so that documentary data 701 can be separately processed by such discrete models (400) based on these respective predefined document types/categories and, in certain embodiment, additionally learned types and categories. Accordingly, the discrete models (400) can provide the collective characteristics of documentary data 701 for generating the entity profile or document schema 710.

Referring back to FIG. 3, with entity profile or document schema 710 incorporated at information system 220, process 300 concludes with steps s315 and s320. As illustrated in FIG. 3, at step 315, a subset of documents (e.g., documentary data 901) from profiled documentary data 701 is selected based at least in part on entity profile 710. Next, at step s320, the selected subset of documents (e.g., documentary data 901) is tagged for further processing (step s320). In an exemplary embodiment, document profiling model 400 and a document processing model (not shown) are executed, in part or in the whole, by one or more of processing apparatus 201, user device 230, and information system 220. The data resulting from executing document profiling model 400 and the document processing model (not shown) can, likewise, be maintained, in part or in the whole, by information system 220, processing apparatus 201, and/or user device 230. For such tagging, a subset of the processed documentary data (not shown) is retrieved from data repository 225, via information system 220, for profiling by document profiling model 400 and for tagging by the document processing model (not shown). In one implementation, the profiling of retrieved documentary data by model 400 is conducted in a recursive or iterative manner in cooperation with the document processing model (not shown) until at least a particular document type suitable for further processing has been identified. Once such a state has been reached, the documentary data identified as suitable for further processing is tagged for such further processing in data repository 225 (and/or information system 220).

According to one example implementation, the tagging of the documentary data 901 is conducted on a segment level and/or a document level to facilitate recursive or iterative processing up and down the segment/document hierarchy.

Figure 7:
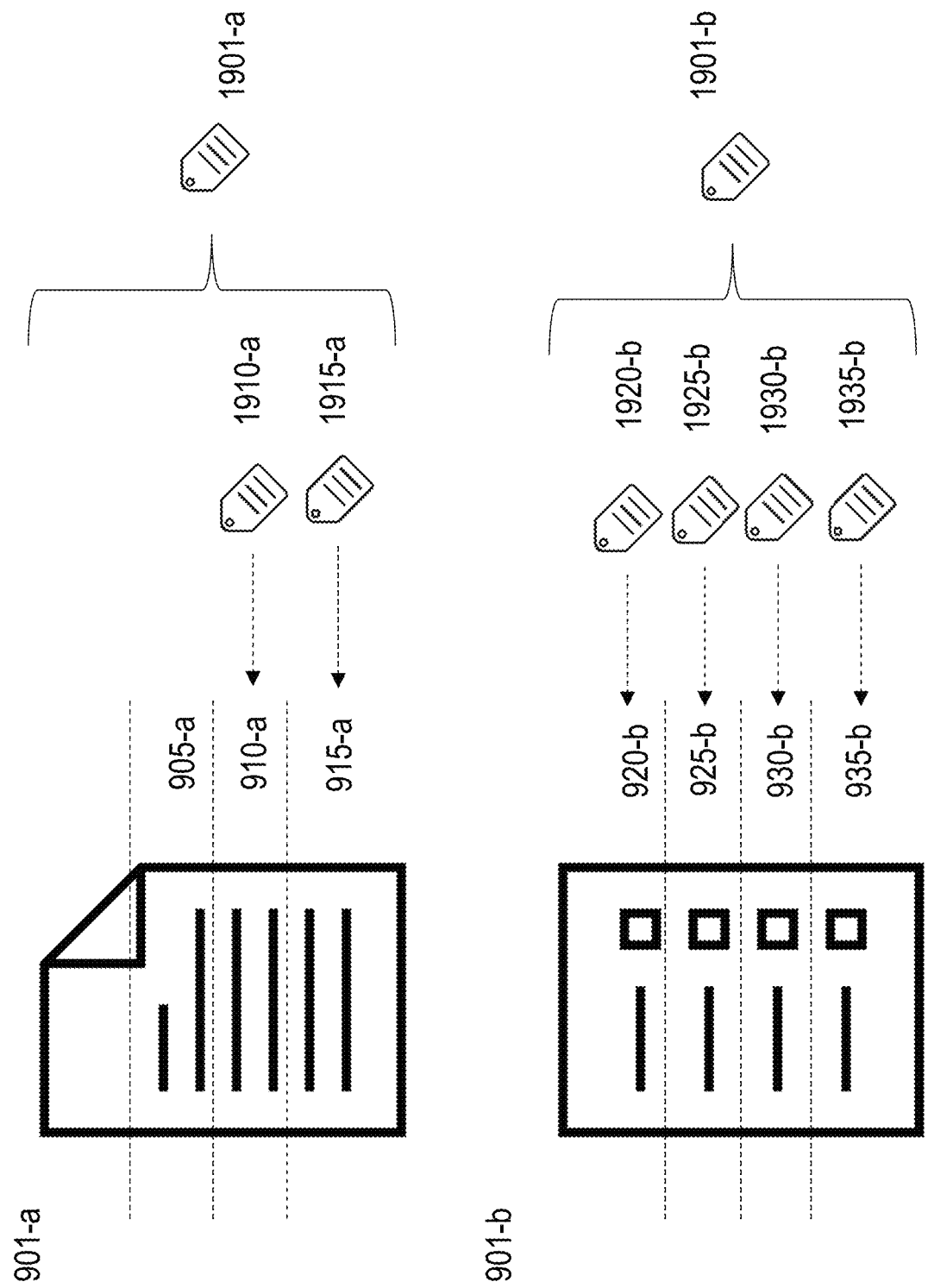
FIG. 7 is a diagram for illustrating the segment level and document level tagging of documentary data in accordance with one exemplary embodiment of the present disclosure.

FIG. 7 is a diagram for illustrating the segment level and document level tagging of documentary data 901 in accordance with one exemplary embodiment of the present disclosure. In FIG. 7, symbolic representations of two (2) example documents 901-*a* and 901-*b* included in documentary data 901 are illustrated with respective identified segments 905-*a*, 910-*a*, 915-*a*, 920-*b*, 925-*b*, 930-*b*, and 935-*b*. According to one example implementation, based on segment importance and contribution, among other factors, a hierarchical identification tag (1910-*a*, 1915-*a*, 1920-*b*, 1925-*b*, 1930-*b*, 1935-*b*, 1901-*a*, and 1901-*b*) is applied to segments 910-*a*, 915-*a*, 920-*b*, 925-*b*, 930-*b*, and 935-*b* and documents 901-*a* and 901-*b* themselves. FIG. 7 provides symbolic illustrations of tags 1910-*a*, 1915-*a*, 1920-*b*, 1925-*b*, 1930-*b*, 1935-*b*, 1901-*a*, and 1901-*b*, the underlying data of which is incorporated with documentary data 901 in one or more of processing apparatus 201, information system 220, and user device 230 according to one implementation of the present disclosure. In embodiments, tags 1910-*a*, 1915-*a*, 1920-*b*, 1925-*b*, 1930-*b*, 1935-*b*, 1901-*a*, and 1901-*b* can comprise indications for relative importance or hierarchical relationships among the segments 905-*a*, 910-*a*, 915-*a*, 920-*b*, 925-*b*, 930-*b*, and 935-*b* within the respective documents 1901-*a* and 1901-*b* and/or among overall segments in all documents. Thus, the tags can be assigned and processed in respective hierarchical processes from the segment level (e.g., 905-*a*, 910-*a*, 915-*a*, 920-*b*, 925-*b*, 930-*b*, and 935-*b*) up to the document level (e.g., 901-*a* and 901-*b*) and vice versa. In embodiments, the tags (e.g., 1910-*a*, 1915-*a*, 1920-*b*, 1925-*b*, 1930-*b*, 1935-*b*, 1901-*a*, and 1901-*b*) can be incorporated with the document type profiles and/or individual document profiles.

FIG. 7 illustrates an example implementation where segment 905-*a* is identified as insignificant for further processing—e.g., for topic extraction—and a corresponding importance tag is not assigned for such further processing.

Accordingly, in embodiments, segment 905-*a* can be disregarded in the further processing. In another example implementation, all segments and documents can include at least one respective tag for providing relevant identification and/or hierarchical information that is relevant to the further processing. In embodiments, such further processing can include, but not be limited to, a topic extraction process, a document processing algorithm selection process, a topic importance rating process, a knowledge graph mapping process, a document signature generation process, a document querying process, and a language derivation process.

Advantageously, the document profiling process of the present disclosure provides a technical solution to the problem of large volumes of documents maintained by entities that include disparate document types and that require different processing techniques to extract meaningful information from all such documents. By training an entity-specific document profiling model and generating an entity profile, suitable document processing techniques can be customized for processing documentary data maintained by an entity.

In one example implementation, the further processing includes a topic extraction process for determining and identifying meaningful topics included in one or more types of documents among disparate document types maintained by an entity.

Figure 8:
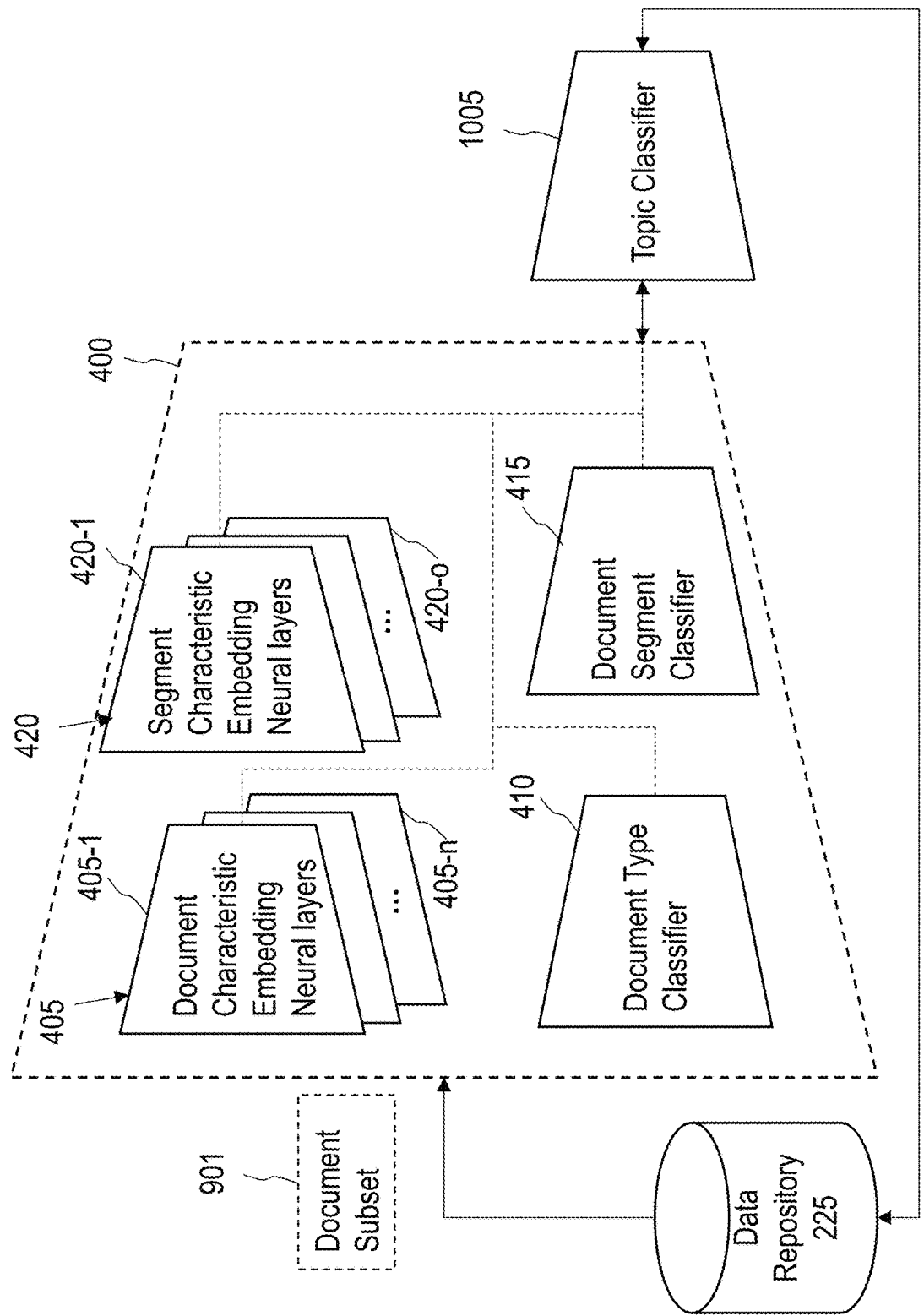
FIG. 8 is a schematic diagram showing a network structure of document profiling model and a topic classifier for conducting a topic extraction process according to an example implementation of the present disclosure.

FIG. 8 is a schematic diagram of a network structure for document profiling model 400 and a topic classifier 1005 for conducting a topic extraction process according to an example implementation of the present disclosure. In an exemplary embodiment, document profiling model 400 and topic classifier 1005 are executed, in part or in the whole, by one or more of processing apparatus 201, user device 230, and information system 220. The data resulting from executing document profiling model 400 and topic classifier 1005 can, likewise, be maintained, in part or in the whole, by information system 220, processing apparatus 201, and/or user device 230.

As illustrated in FIG. 8, documentary data (or document subset) 901 is retrieved from data repository 225, via information system 220, for profiling by document profiling model 400 and for topic extraction using topic classifier (e.g., ML classification model) 1005. In one implementation, the profiling of documentary data 901 by model 400 is conducted in a recursive or iterative manner with the training of topic classifier 1005. Thus, the profiling of documentary data 901, which can include weights for segment hierarchy, segment importance, and the like, by document profiling model 400 is passed to topic classifier 1005 in alternating forward and backward passes, until a prediction error of classifier 1005 is sufficiently low. In the forward pass, the profiled characteristics of documentary data 901 by model 400 is passed through classifier 1005 to generate predicted topic labels. In the backward pass, errors of the predictions are used to update and improve classifier 1005 and reduce its errors. To update the weights of classifier 1005, the errors are backpropagated through its network. After a number of iterations (epochs) over the training data (or documentary data) 901, the weights of classifier 1005 approach values that minimize the prediction errors on the profile weights passed by model 400 on documentary data 901. Once such a state has been reached, topic extraction on documentary data 901—and, indeed, additional types of documents from information system 220 maintained by or for the entity—can be conducted on data repository 225 (and/or information system 220). In embodiments, the recursive topic extraction process can start with a derived plurality of weights from profiling the document subset 901 using document profiling model 400 for corresponding topics (e.g., identified using topic classifier 1005). Then, one or more additional iterations of the profiling of the document subset 901 using document profiling model 400 can be executed based on the initially derived weights, which may be conducted for respective topics identified using topic classifier 1005. The recursive or iterative executions can be conducted until one or more important sections, segments, or chapters comprised in the document subset 901 is determined. Correspondingly, as illustrated in FIG. 8, the identified topics (not shown) using topic classifier 1005, along with one or more document type profiles and/or individual document profiles associated with document subset 901, can be updated based on the determined important sections, segments, or chapters in data repository 225.

Examples

Figure 9:
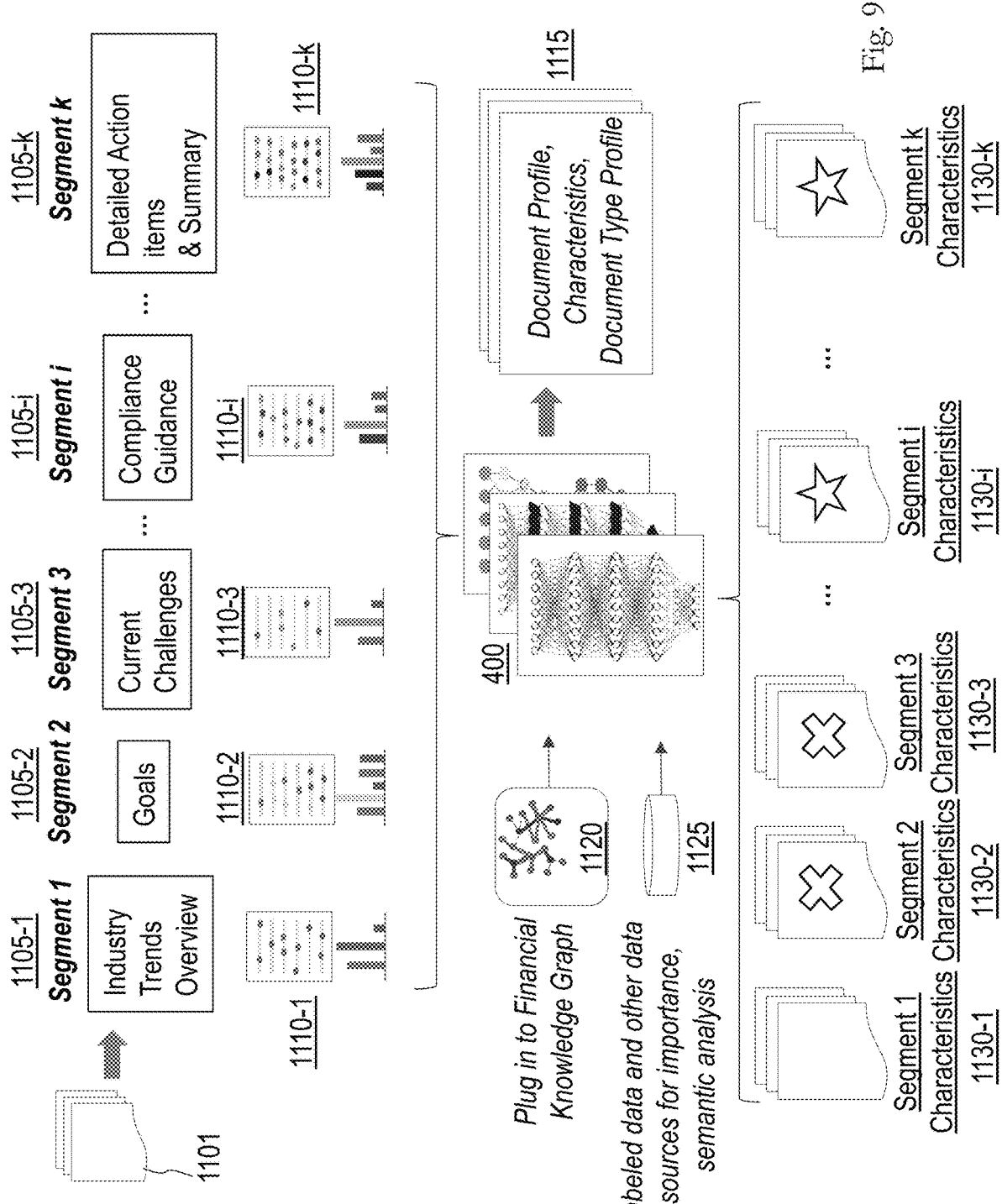
FIG. 9 is a diagram illustrating an example implementation of a document and document segment profiling process of the present disclosure.

FIG. 9 illustrates an example of a financial services document 1101 being divided into segments (which are pre-defined sections) on "Industry Trends Overview" 1105-1, "Goals" 1105-2, "Current Challenges" 1105-3, "Compliance Guidance" 1105-*i*, and "Detailed Action Items and Summary" 1105-*k* (e.g., via trained document segment classifier 415 though steps s510 and s515). As shown in FIG. 11, the divided segments 1105, with respective segment topic characteristics 1110-1 . . . 1110-*k*, are passed through document profiling model 400, which includes plural neural networks that are trained to determine document profiles, characteristics, and document type profiles 1115. In the example implementation, training and topic extraction is based on the input document 1101, along with characteristics of document 1101 in the form of a knowledge graph (KG) 1120 and labeled data 1125, which includes data from other sources on importance and semantic analytical parameters. In this example, the learning-based analysis over document 1101 and its document type by model 400 learns and determines that segment "k" 1105-*k* on "Action items and summary" and segment "i" 1105-*i* on "Compliance Guidance" are the most significant regions in terms of topic extraction, for semantic search, etc. Additionally, for example, segments (or sections) "2" and "3" are determined to be insignificant for topic extraction. Thus, representations are incorporated by document profiling model 400 that reflect the respective high and low significances (e.g., weights) of these segments for topic extraction in the type profile and/or document profile. As illustrated in FIG. 9, segment characteristics 1130-1 . . . 1130-*k* for document 1101 reflecting these determinations are learned by model 400 as part of the type and document profile for a "financial services document" having the same or similar characteristics as document 1101. Correspondingly, importance and weights of the remaining segments are custom calculated and learned by document profiling model 400 and, in turn, by topic extraction classifier 1005 based on segment characteristics 1130-1 . . . 1130-*k*. Additionally, particular topic keywords—e.g., three (3) topic keywords—are associated with the document and incorporated in the document profile with topic keyword characteristics being accounted for in the type profile—e.g., mapped to a particular region on a KG and/or suitable for a particular topic extraction algorithm.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, like reference numerals have been used, where possible, to designate like elements common to the figures. In certain instances, a letter suffix following a dash ( . . . -b) denotes a specific example of an element marked by a particular reference numeral (e.g., 210-*b*). Description of elements with references to the base reference numerals (e.g., 210) also refer to all specific examples with such letter suffixes (e.g., 210-*b*), and vice versa.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof, and are meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope encompassed by the present disclosure, which is defined by the set of recitations in the following claims and by structures and functions or steps which are equivalent to these recitations.

What is claimed is:

1. A computer-implemented method of structuring entity data using a machine learning document profiling model for improved information extraction, comprising:

obtaining, by a processor via a communication interface, document data comprising a plurality of different document types associated with an entity from a document repository;

training, by the processor, a learning document profiling model by applying at least a portion of the obtained document data and identification information on the plurality of different document types to the learning document profiling model, said training comprising:

extracting, using a plurality of document characteristic embedding neural layers and a plurality of segment characteristic embedding neural layers of the learning document profiling model, a plurality of document characteristics related to respective documents comprised in the applied document data, said plurality of document characteristics being selected from the group consisting of document length, document structure, semantic neighborhood, segment-level divergence, segment and document-level hierarchies, keyword frequencies, topic characteristics, structure and topic correlations, hierarchical topic divergence, criticality or importance of structural components, actionability of structural components, critical data content, language characteristics, functional characteristics, sentence structure, and information content metrics;

generating a plurality of document profiles for the respective documents comprised in the applied document data based on the extracted characteristics;

generating respective document type profiles for association with the plurality of different document types of the applied document data, said respective document type profiles each comprising one or more of the extracted characteristics shared by the respective documents of the plurality of different document types; and reorganizing, in the document repository, a plurality of the respective documents comprised in the applied document data based on the extracted document characteristics, the generated document profiles, and the generated document type profiles; and profiling, by the processor, the obtained document data using the trained learning document profiling model, said profiling comprising:

categorizing one or more documents without a document type comprised in the profiled document data using the trained learning document profiling model, said categorizing comprising an assignment of a type to each of the one or more documents without a document type;

deriving a plurality of weights for each type of documents comprised in the profiled document data using the trained learning document profiling model;

generating a type profile for the each type of documents using the trained learning document profiling model, the type profile comprising the plurality of weights derived in association with the each type of documents; and generating an individual document profile for each document comprised in the profiled document data using the trained learning document profiling model, the individual document profile comprising the plurality of weights derived in association with a type of the each document;

generating, by the processor, an entity profile using the trained learning document profiling model based on the profiled document data;

selecting, by the processor, a subset of documents comprised in the profiled document data based on the entity profile; and tagging, in a memory communicatively connected to the processor, the selected subset of documents for further processing comprising one or more of a topic extraction process, a document processing algorithm selection process, a topic importance rating process, a knowledge graph mapping process, a document signature generation process, a document querying process, and a language derivation process based on the plurality of weights.

2. The method of claim 1, wherein said reorganizing comprises generating definition information for modifying the identification information on the plurality of different document types.

3. The method of claim 1, wherein the plurality of document profiles comprise correlations among at least some of the extracted document characteristics.

4. The method of claim 1, further comprising, prior to the training of the learning document profiling model, deriving, by the processor, one or more pre-existing document labels of the obtained document data from the document repository for applying the derived one or more pre-existing document labels with the applied document data, said one or more pre-existing document labels comprising at least one segment characteristic associated with a corresponding document.

5. The method of claim 1, wherein the training of the learning document profiling model further comprises profiling the respective documents comprised in the applied document data based on one or more of a segment hierarchy and a component hierarchy using a segment divergence threshold.

6. The method of claim 1, wherein the training of the learning document profiling model further comprises profiling the respective documents comprised in the applied document data based on criticality or importance of structural components using labeled data.

7. The method of claim 6, wherein, for the profiling of the obtained document data, the derived plurality of weights comprise segment importance weights for the each type of documents comprised in the processed document data.

8. The method of claim 7, wherein one or more of the segment importance weights indicate exclusion of one or more corresponding document segments from the further processing.

9. The method of claim 1, further comprising:

executing, by the processor, said further processing on the selected subset of documents based on the tagging, wherein the further processing is a recursive topic extraction process, starting with the derived plurality of weights from the profiling of the obtained document data using the trained learning document profiling model, to extract one or more topics from the selected subset of documents in an iterative or recursive manner, one or more additional derived weights from one or more executions of the profiling of the obtained data using the trained learning document profiling model acting as the derived plurality of weights for a next iteration, until one or more important sections, segments, or chapters of the selected subset of documents is determined, wherein one or more of the type profiles and individual document profiles associated with the selected subset of documents are updated based on the one or more important sections, segments, or chapters.

10. The method of claim 1, wherein the learning document profiling model comprises a neural network-based architecture with one or more components for respective one or more of document length learning, structure learning, semantic learning, topic and keyword learning and characterization, sentence structure learning, and information content learning.

11. The method of claim 1, wherein the learning document profiling model comprises a neural network-based architecture with one or more components for respective one or more of document length learning, structure learning, semantic learning, topic and keyword learning and characterization, sentence structure learning, and information content learning.

12. An apparatus for restructuring entity data using a machine learning document profiling model for improved information extraction, comprising:

a communication interface adapted to communicated with a document repository;

a learning document profiling model adapted to profile a plurality of different document types associated with an entity;

a processor communicatively connected to the communication interface and to the learning document profiling model, said processor comprising a memory having stored therein instructions that, when executed, causes the processor to:

obtain document data comprising a plurality of different document types associated with an entity from the document repository;

train the learning document profiling model by applying at least a portion of the obtained document data and identification information on the plurality of different document types to the learning document profiling model, said training comprising:

extracting, using a plurality of document characteristic embedding neural layers and a plurality of segment characteristic embedding neural layers of the learning document profiling model, a plurality of document characteristics related to respective documents comprised in the applied document data, said plurality of document characteristics being selected from the group consisting of document length, document structure, semantic neighborhood, segment-level divergence, segment and document-level hierarchies, keyword frequencies, topic characteristics, structure and topic correlations, hierarchical topic divergence, criticality or importance of structural components, actionability of structural components, critical data content, language characteristics, functional characteristics, sentence structure, and information content metrics;

generating a plurality of document profiles for the respective documents comprised in the applied document data based on the extracted characteristics;

generating respective document type profiles for association with the plurality of different document types of the applied document data, said respective document type profiles each comprising one or more of the extracted characteristics shared by the respective documents of the plurality of different document types; and reorganizing, in the document repository, a plurality of the respective documents comprised in the applied document data based on the extract document characteristics, the generated document profiles, and the generated document type profiles; and profile the obtained document data using the trained learning document profiling model, said profiling comprising:

categorizing one or more documents without a document type comprised in the profiled document data using the trained learning document profiling model, said categorizing comprising an assignment of a type to each of the one or more documents without a document type;

deriving a plurality of weights for each type of documents comprised in the profiled document data using the trained learning document profiling model;

generating a type profile for the each type of documents using the trained learning document profiling model, the type profile comprising the plurality of weights derived in association with the each type of documents; and generating an individual document profile for each document comprised in the profiled document data using the trained learning document profiling model, the individual document profile comprising the plurality of weights derived in association with a type of the each document;

generate an entity profile using the trained learning document profiling model based on the profiled document data;

select a subset of documents comprised in the profiled document data based on the entity profile; and tag, in the memory, the selected subset of documents for further processing comprising one or more of a topic extraction process, a document processing algorithm selection process, a topic importance rating process, a knowledge graph mapping process, a document signature generation process, a document querying process, and a language derivation process based on the plurality of weights.

13. The apparatus of claim 12, wherein said reorganizing comprises generating definition information for modifying the identification information on the plurality of different document types.

14. The apparatus of claim 12, wherein the plurality of document profiles comprise correlations among at least some of the extracted document characteristics.

15. The apparatus of claim 12, wherein the memory has stored therein further instructions that, when executed, cause the processor to derive, prior to the training of the learning document profiling model, one or more pre-existing document labels of the obtained document data from the document repository for applying the derived one or more pre-existing document labels with the applied document data, said one or more pre-existing document labels comprising at least one segment characteristic associated with a corresponding document.

16. The apparatus of claim 12, wherein the training of the learning document profiling model further comprises profiling the respective documents comprised in the applied document data based on one or more of a segment hierarchy and a component hierarchy using a segment divergence threshold.

17. The apparatus of claim 12, wherein the training of the learning document profiling model further comprises profiling the respective documents comprised in the applied document data based on criticality or importance of structural components using labeled data.

18. The apparatus of claim 17, wherein, for the profiling of the obtained document data, the derived plurality of weights comprise segment importance weights for the each type of documents comprised in the processed document data.

19. The apparatus of claim 18, wherein one or more of the segment importance weights indicate exclusion of one or more corresponding document segments from the further processing.

20. The apparatus of claim 12, wherein the memory has stored therein further instructions that, when executed, cause the processor to execute said further processing on the selected subset of documents based on the tagging, wherein the further processing is a recursive topic extraction process, starting with the derived plurality of weights from the profiling of the obtained document data using the trained learning document profiling model, to extract one or more topics from the selected subset of documents in an iterative or recursive manner, one or more additional derived weights from one or more executions of the profiling of the obtained data using the trained learning document profiling model acting as the derived plurality of weights for a next iteration, until one or more important sections, segments, or chapters of the selected subset of documents is determined, wherein one or more of the type profiles and individual document profiles associated with the selected subset of documents are updated based on the one or more important sections, segments, or chapters.

* * * * *